United States Patent [19]

Anderson

[11] Patent Number: 5,220,845
[45] Date of Patent: Jun. 22, 1993

[54] VIBRATORY COMPACTOR BEARING LUBRICATION

[75] Inventor: Jack T. Anderson, Independence, Ohio

[73] Assignee: N.P.K. Equipment Construction, Inc., Walton Hills, Ohio

[21] Appl. No.: 864,227

[22] Filed: Apr. 6, 1992

[51] Int. Cl.$^5$ ............................................. F16H 33/00
[52] U.S. Cl. ............................................ 74/61; 37/904; 74/87; 184/13.1; 404/102; 404/133.2
[58] Field of Search ................................ 404/102, 133.2; 37/DIG. 18; 74/61, 87; 366/128; 184/11.1, 13.1

[56] References Cited

U.S. PATENT DOCUMENTS

| | | | |
|---|---|---|---|
| 1,587,214 | 6/1926 | Byrne | 184/13.1 |
| 3,522,740 | 8/1970 | Hynes et al. | 74/87 |
| 3,561,336 | 2/1971 | Century | 404/133.2 |
| 3,722,381 | 3/1973 | Tuneblom | 74/87 X |
| 4,224,003 | 9/1980 | St. Louis | 404/133.2 |

OTHER PUBLICATIONS

Four pages from a manual describing the TRA-PAC hydraulic compactor/driver model TR-14 from Tramac.

Two drawing sheets showing the lubrication system for the C-12 compactor/driver from NPK.
An instruction Manual for model C-2, C-4b, C-6 and C-8 hydraulic compactor/driver, author: NPK; 1991.
A catalog sheet describing drivers C-2, C-4b, C-6, C-8 and C-12, author: NPK, 1991.

*Primary Examiner*—Allan D. Herrmann
*Assistant Examiner*—David W. Laub
*Attorney, Agent, or Firm*—Body, Vickers & Daniels

[57] ABSTRACT

A method of lubricating the roller bearings journaling the rotatable, vibration imparting, eccentric mass in the closed cavity of a vibratory compactor housing comprising the step of providing a layer of lubricating oil at the bottom of the housing cavity having its upper surface spaced below but relatively close to the nadir point of the circular path of travel of the maximum radially extending node portion of the eccentric mass about its eccentric axis of rotation whereby to prevent penetration of the node portion directly into the oil layer itself and instead permitting the impacting of the node portion only with the upstanding thin columns of oil which are continuously formed at the upper surface of the oil layer, during the vibration of the housing and oil layer, to thereby splatter the oil from the impacted oil columns upwardly within the housing and into the roller bearings.

27 Claims, 3 Drawing Sheets

VIBRATORY COMPACTOR BEARING LUBRICATION

This invention relates in general to vibratory compactors such as are used in the construction industry for compacting soil, or for sheet and pile driving, and more particularly to the lubrication of the bearings for the support shaft of the rotating vibration-imparting eccentric mass of such compactor.

BACKGROUND OF THE INVENTION

Vibratory compactors or drivers are in common use in the construction industry for compacting loose soil such as that from dug up trenches and the like, or for sheet or pile driving purposes. The term vibratory compactor as used hereinafter is intended to also include vibratory drivers. Such vibratory compactors or drivers are generally comprised of a closed housing mounted by rubber shear mounts for vibratory motion within and with respect to a support frame which is pivotally mounted in depending relation on the free end of the boom or work arm of a carrier machine, such as a backhoe or excavator, for pivotal movement in the vertical plane of the boom. Fixedly secured in a horizontal position to the bottom of the housing, in a position lying clear of the lower end of the compactor support frame, is a flat rigid metal impactor plate or base plate adapted to be pressed downwardly by the boom against the soil to be compacted, or against the sheet or piling to be driven into the ground, while the impactor plate and its support housing are vibrated at a rapid rate. The vibratory motion of the unitary impactor plate and support housing is imparted thereto by a relatively heavy eccentric mass member which is rotatably mounted within the housing, by roller bearings seated therein, for rotation at a relatively high speed about an eccentric horizontal axis by a hydraulic motor mounted on the housing. The rapidly rotated eccentric mass causes the entire compactor housing and impactor plate to vibrate at a high rate, thereby effectively compacting the loose soil or driving the sheet or piling engaged by the impactor plate.

Because of the eccentricity of the rotating load and the resulting high bearing forces applied to the support bearings for the eccentric mass, adequate lubrication of the support bearings is critical. Two methods of lubrication of these support bearings have been employed in the past. One method involves the use of a grease fitting for each of the bearings for the eccentric mass. Because lubrication of the support bearings is so important, an aggressive daily greasing schedule therefor is recommended. This sometimes results in the entire cavity of the compactor housing becoming filled with grease which not only is wasteful but is detrimental to performance of the compactor in that the grease filling impedes the rotation of and imparts a load to the rotating eccentric mass. Another method of lubricating the support bearings for the eccentric mass employs a bath or filling of lubricating oil in the eccentric housing to a level to be contacted and penetrated by the eccentric mass during each revolution thereof so as to splash oil upwardly out of the body of oil and onto the support bearings. For such purpose, a substantial body of oil is required at all times in the eccentric housing in order to assure that the eccentric mass penetrates the oil body regularly during its rotation and splashes oil therefrom onto the support bearings. Also, elaborate splash directors are required in the housing to redirect the splashed oil upwardly into the support bearings to assure uniform and constant lubrication thereof. Additionally, because the compactor units are often stored upside down, baffling systems and the like to maintain the oil reservoir inside the housing cavity are required.

SUMMARY OF THE INVENTION

The present invention contemplates a new and improved vibratory compactor or driver assembly and method of lubrication thereof which overcomes all of the above referred to problems and others and assures positive and efficient lubrication of the support bearings for the eccentric mass thereof for extended periods of service operation and with reduced maintenance requirements.

Briefly stated, in accordance with one aspect of the invention, the housing cavity for the rotatable eccentric mass of a vibratory compactor or driver assembly is provided with, and the support bearings for the eccentric mass of such a compactor or driver assembly are lubricated only by a layer of oil provided in the housing cavity having its top surface spaced a slight distance below the nadir point of the circular path of travel of the maximum radial dimension or node portion of the rotating eccentric mass about its eccentric axis of rotation when the compactor is in a vertical operating position so that such maximum radial dimension or node portion will engage and impact only with, and spatter upwardly throughout the housing cavity and into the roller support bearings for the eccentric mass, oil from the upstanding narrow columns of oil which are normally continuously formed at the upper surface of the oil layer within the housing cavity by the vibratory motion induced therein by the vibratory action imparted to the housing by the rotating eccentric mass. This form of lubrication of the roller support bearings is effective not only when the vibratory compactor is operated in a vertical position but is also effective when the compactor is positioned at different operating angles to its normal vertical operating position as great as 45° or thereabouts.

The principal object of the invention is to provide a vibratory compactor operative to supply improved and effective lubrication of the support bearings for its rotatable eccentric mass.

Another object of the invention is to provide a vibratory compactor affording reduced required lubrication maintenance service for assuring adequate and effective lubrication of the support bearings for its rotatable eccentric mass.

Still another object of the invention is to provide a novel method for adequately and effectively lubricating the support bearings for the rotatable eccentric mass of a vibratory compactor.

A further object of the invention is to provide a novel method for adequately and effectively lubricating the support bearings for the rotatable eccentric mass of a vibratory compactor from a bath of lubricating oil in the housing for the eccentric mass.

A still further object of the invention is to provide a method for adequately and effectively lubricating the support bearings for the rotatable eccentric mass of a vibratory compactor from a bath of lubricating oil in the housing for the eccentric mass which method is operative for angular as well as vertical operating positions of the compactor.

Yet another object of the invention is to provide a novel method for effectively lubricating the support bearings for the rotatable eccentric mass of a vibratory compactor from an oil bath which method eliminates the need for providing splashed oil directors within the housing for the eccentric mass.

Further objects and advantages of the invention will appear from the following detailed description of a preferred embodiment thereof and from the accompanying drawings.

DESCRIPTION OF THE PREFERRED EMBODIMENT

Figure 1:
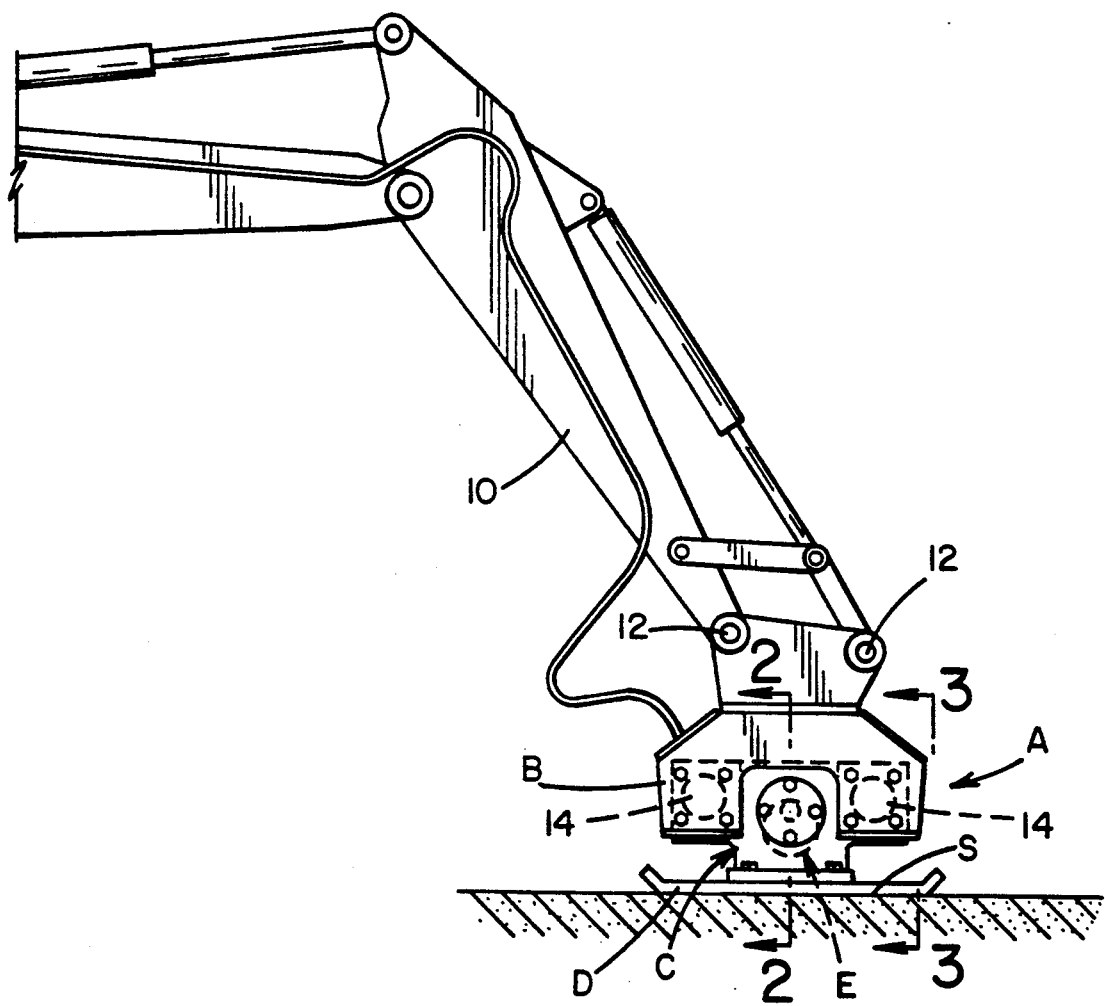
FIG. 1 is a side elevational view of a vibratory compactor according to the invention shown mounted in operative position on the boom of a carrier machine such as a backhoe or an excavator.
Figure 2:
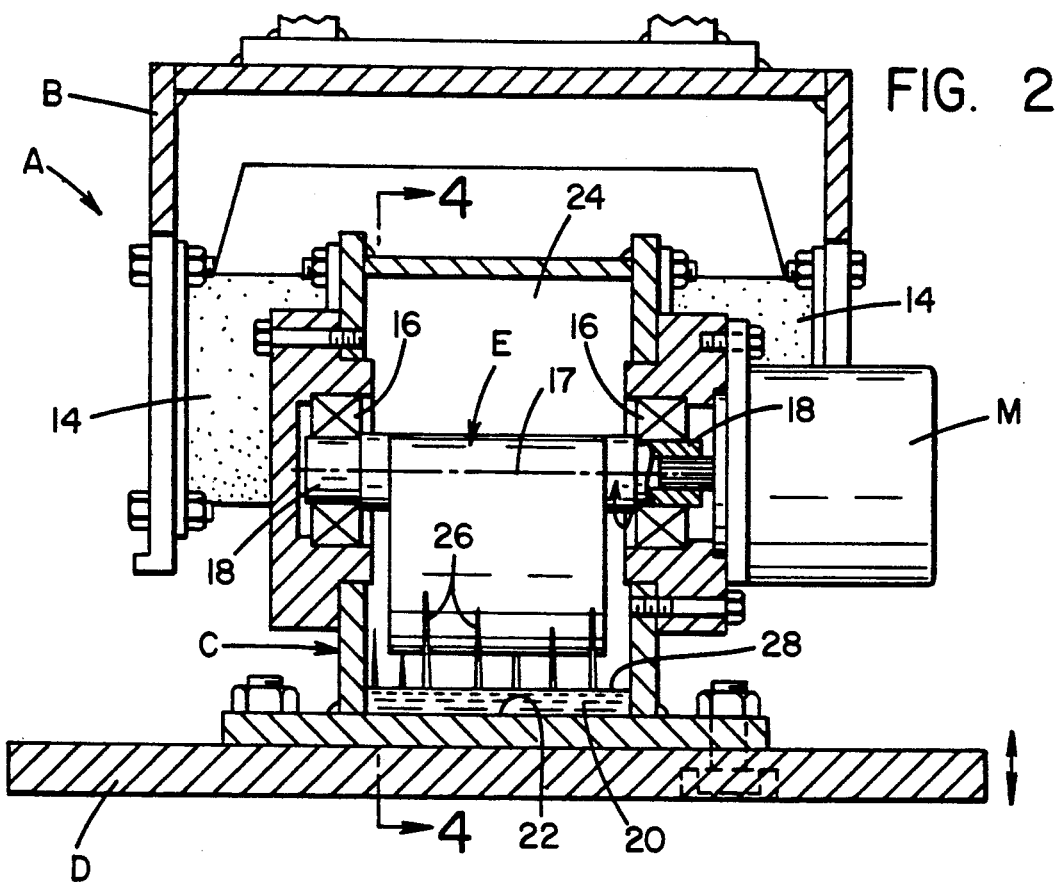
FIG. 2 is a vertical section on the axis of rotation of the rotatable eccentric mass of the vibratory compactor according to the invention.
Figure 3:
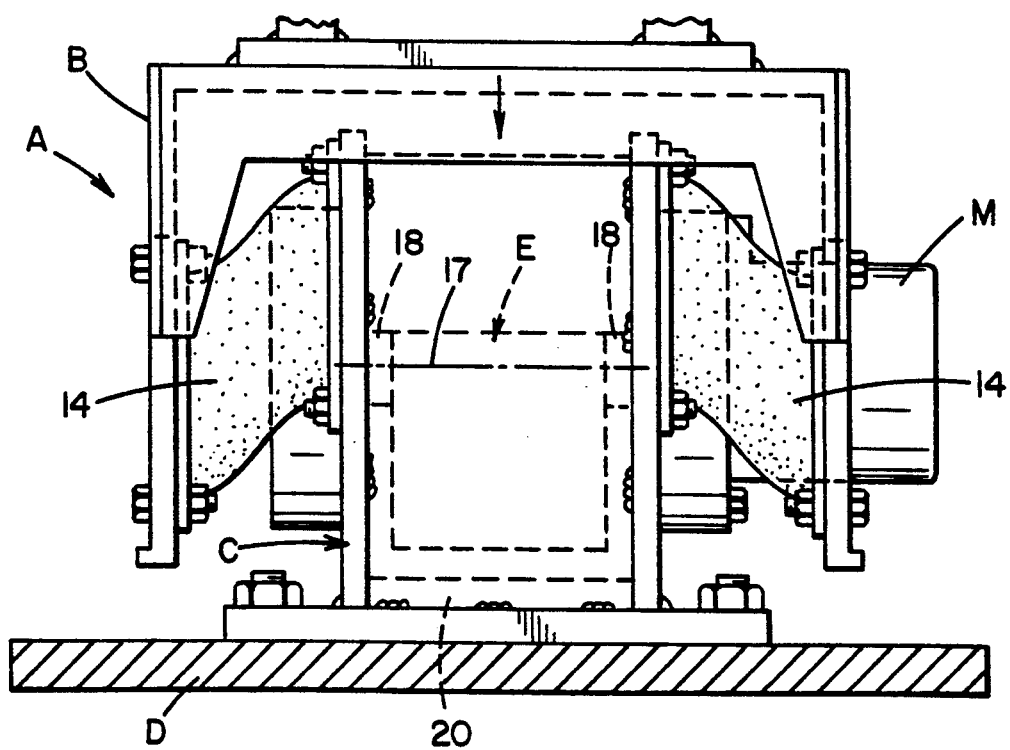
FIG. 3 is an end elevational view of the vibratory compactor showing the rubber mounts for the housing thereof.

Referring now to the drawings wherein the showings are for the purposes of illustrating a preferred embodiment of the invention only and not for the purposes of limiting same, FIG. 1 illustrates a vibratory compactor or driver assembly A according to the invention mounted in operative position on the free end of a boom 10 on a carrier machine such as a backhoe or excavator (not shown). The vibratory compactor or driver assembly A is of conventional mechanical construction generally comprising a U-shaped support frame B pivotally mounted by pivot pins 12 for pivotal movement in a vertical plane on the boom 10; a closed housing C suitably resiliently mounted inside the support frame B, as by a plurality (four) of rubber shear mounts 14 (FIGS. 2 and 3), for vibratory motion in a vertical plane relative to the support frame; a preferably rectangular shaped, flat rigid steel impactor plate or base plate D bolted to the bottom of the housing C for vibratory motion therewith and impacting against the loose soil to be compacted or against the sheet or piling to be driven into the ground; and a heavy, steel eccentric mass member E rotatably mounted at its opposite sides within the housing C by roller bearings 16 supported therein for rotation about a horizontal eccentric axis 17 at a relatively high rate of speed, e.g. between 1500 to 2500 rpm, by a hydraulic motor M mounted on the housing C and having a direct drive with one of the two unitary side stub shaft portions 18 of the eccentric mass E. During operation of the vibratory compactor A, the eccentricity of the rapidly rotating eccentric mass E causes the entire resiliently mounted housing C and its unitary impactor plate D to violently vibrate in a vertical plane relative to the support frame B at a high rate, e.g. 1500–2500 cycles per minute. When pressed downwardly against the loose soil 10 to be compacted or against the sheet or piling to be driven into the ground by the operation of the carrier machine boom 10, the rapidly vibrating impactor plate D of the compactor A will compact the loose soil or drive the sheet or piling into the ground. The mechanical construction of the vibratory compactor or drive assembly B as so far described is of conventional form and constitutes no part of the present invention.

As previously stated, because of the severe load forces applied to the roller support bearings 16 by the rapidly rotating eccentric mass E as a result of its eccentric journal mounting, proper lubrication of the roller support bearings 16 for the eccentric mass E is critical and must be constantly maintained. Heretofore, the roller support bearings 16 have been conventionally lubricated by regularly or daily applying grease thereto through grease fittings located at the bearings, or by maintaining a bath of lubricating oil in the housing C at a high enough level to assure the dipping and penetration of the eccentric mass E thereinto during its rotation so as to splash oil upwardly therefrom and onto the roller support bearings 16. For the reasons previously stated, however, neither of these lubrication methods has proven entirely satisfactory.

Figure 4:
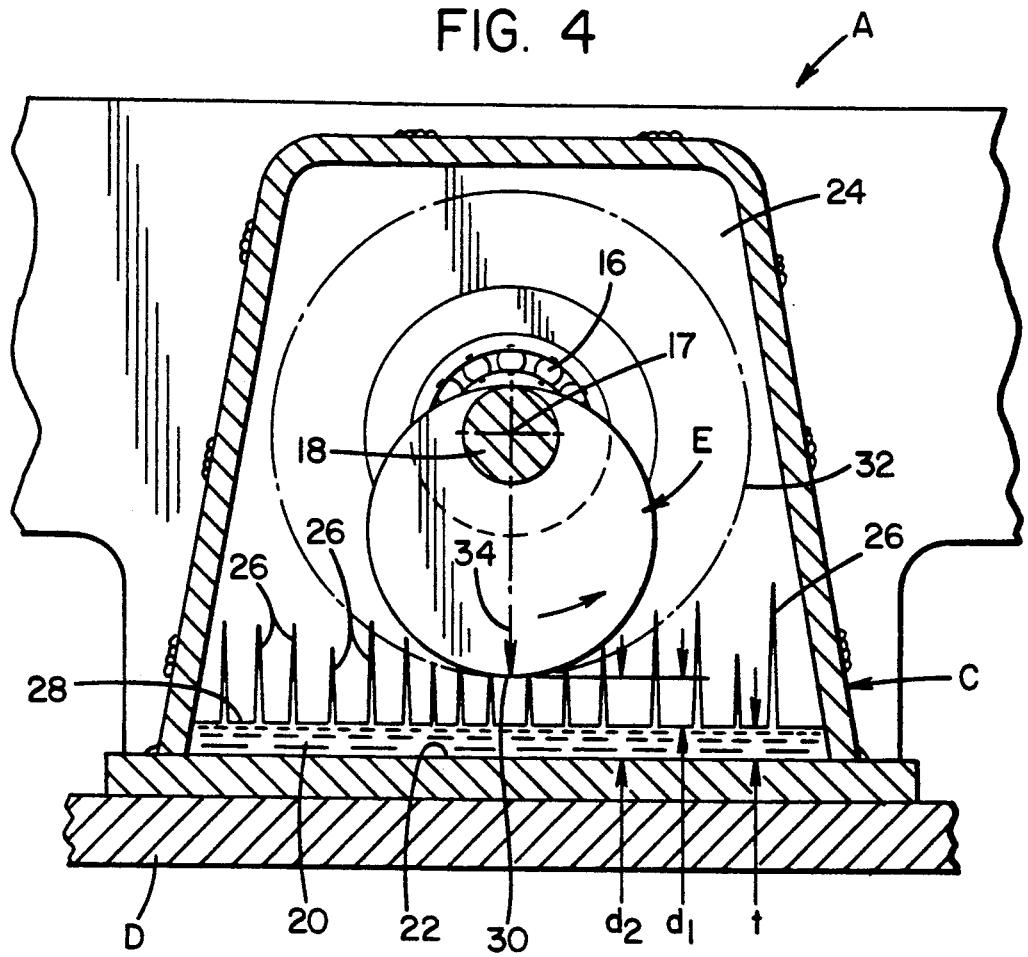
FIG. 4 is an enlarged vertical sectional view through the housing of the vibratory compactor taken on the line 4—4 of FIG. 2 and showing the manner of lubricating the support bearings for the rotatable eccentric mass therein in accordance with the invention; and, FIG. 5 is a schematic sectional view similar to FIG. 4 showing different angular operating positions of the vibratory compactor relative to the vertical in which the novel lubricating method is also operative to effectively lubricate the support bearings for the eccentric mass.

It has been found that a layer or bath 20 of lubricating oil positioned on the flat bottom surface 22 of the eccentric mass containing cavity 24 of the compactor housing C will continuously produce a profusion of upstanding, narrow columns or spouts 26 of oil at the upper surface 28 of the oil layer 20, as shown in FIG. 4, when the compactor A is placed in vibratory operation by rotation of the eccentric mass E about its eccentric axis 17 at the conventional speeds such as around 1500 to 2500 rpm and preferably from 2000 to 2200 rpm. These oil columns 26 vary in height and are significantly taller than they are wide, normally having a height ranging from about $\frac{1}{2}$" to $2\frac{1}{2}$" or so.

In accordance with the invention, the layer or bath 20 of lubricating oil is provided with a thickness t such as to locate its upper surface 28 relatively close to but spaced a sufficient clearance distance $d_1$ below the nadir point 30 of the circular path 32 of travel of the maximum radially dimensioned portion or node 34 of the rotating eccentric mass E, when the compactor is operated in a vertical operating position, to assure that the eccentric mass E will not impact and penetrate directly into and through the layer 20 of oil during its rotation but instead will impact against only the thin columns or spouts 26 of oil which upstand from the upper surface 28 of the oil layer 20 during operation of the compactor A, thereby freely spattering the oil from the impacted oil spouts 26 upwardly throughout the cavity 24 of the housing C and into the roller bearings 16 to effectively lubricate them. For the purposes of the invention, the clearance distance $d_1$ of the nadir point 30 of the circular path of travel of the maximum radially dimensioned node portion 34 of the eccentric mass E from the upper surface 28 of the layer 20 of lubricating oil may range from about $\frac{1}{2}$" to $1\frac{1}{2}$" or so.

The thickness t of the layer or bath 20 of lubricating oil provided at the bottom of the eccentric housing C will depend on the spacing distance $d_2$ of the nadir point 30 of the circular path of travel of the maximum radially dimensioned node portion 34 of the eccentric mass E from the bottom surface 22 of the cavity 24 of the vertically positioned housing C during the rotation of the eccentric mass E therein. In the particular case illustrated in the drawings, where the spacing distance $d_2$ amounts to around 1" or so, a thickness t for the oil layer 20 of around ½" or so will suffice for the purposes of the invention but is preferably maintained at a thickness t of around ¾" to ⅞". The grade of lubricating oil employed for the oil layer 20 may be of a moderate viscosity to assure adequate spattering of the oil from the upstanding columns or spouts 26 of oil upwardly throughout the cavity 24 of the housing C upon their being impacted by the rapidly rotating eccentric mass E so as to afford efficient lubrication of the roller support bearings 16 for the eccentric mass E.

Figure 5:
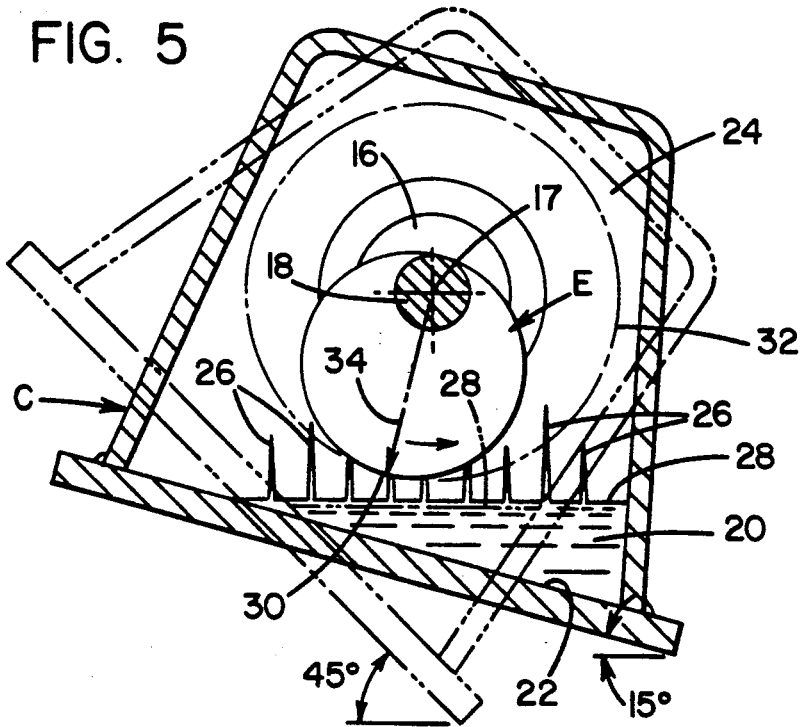

FIG. 5 illustrates the operation of the lubrication method according to the invention to lubricate the support bearings 16 for the eccentric mass E when the vibratory compactor A is operated at different angular operating positions (e.g. 15° and 45°) in the vertical plane normal to the eccentric axis 17 of rotation of the eccentric mass E, relative to the normal vertical operating position of the compactor. As shown, the upper surface 28 of the correspondingly angled oil layer 20 in the angled operating positioned housing C will still be spaced from the node position 34 of the rotating eccentric mass E during its circular path of travel around the eccentric axis 36 of rotation of the eccentric mass E so as to prevent the penetration of the angled layer of oil 20 itself by the node portion 34 and instead permit the node portion to impact only against the upstanding columns 26 of oil formed at the upper surface 28 of the vibrating angled oil layer 20, in accordance with the invention.

The lubrication of the roller bearings 16 for the eccentric mass E in the above described manner provides continuous adequate and efficient lubrication thereof for extended periods of operating time for the compactor A without requiring any maintenance service thereof. Also, the impacting of the rapidly rotating eccentric mass E only with the thin upstanding columns or spouts 26 of oil instead of against and penetrating through the layer 20 of oil itself at the bottom of the housing cavity 24 such as occurs with previously oil bath lubrication methods imposes reduced loading on the hydraulic drive motor M for the eccentric mass E, thereby resulting in longer service life therefor and more uniform vibratory motion of the impactor plate D of the compactor A during operation.

The invention has been described herein with reference to the preferred embodiment thereof. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. A method of lubricating the roller bearings rotatably supporting an eccentric mass for rotation about a horizontal eccentric axis within the cavity of a closed housing resiliently mounted for vibratory movement within and relative to a support frame of a vibratory compactor, comprising the step of providing a layer of lubricating oil at the bottom of the said housing cavity having an upper surface spaced a relatively short distance below the nadir point of the circular path of travel of the maximum radially extending node portion of the rotatable eccentric mass when the compactor is in a vertical operating position, and rotating the said eccentric mass at a relatively high rate of speed to cause the housing and said oil layer to vibrate at a rate to continuously produce thin columns of oil upstanding from the said oil layer and against which the said rotating eccentric mass only impacts to effect the spattering thereof upwardly within the said housing and into the said roller bearings.

2. The method as defined in claim 1, wherein the said upper surface of the said layer of lubricating oil is maintained at a level spaced a distance of around ⅛" to 1¼" below the said nadir point of the circular path of travel of the said node portion of said rotatable eccentric mass.

3. The method as defined in claim 1, wherein the said eccentric mass is rotated at a speed of around 1500 to 2500 rpm.

4. The method as defined in claim 1, wherein the said eccentric mass is rotated at a speed of around 2200 rpm.

5. The method as defined in claim 2, wherein the said eccentric mass is rotated at a speed of around 1500 to 2500 rpm.

6. The method as defined in claim 2, wherein the said eccentric mass is rotated at a speed of around 2200 rpm.

7. The method as defined in claim 1, wherein the said nadir point of the circular path of travel of the maximum radially extending node portion of the said rotating eccentric mass is spaced a distance of about 1" above the upper surface of the bottom wall of said housing cavity and the said oil layer is maintained at a thickness of about ½" to ⅞" when the compactor is in a vertical operating position.

8. The method as defined in claim 7, wherein the said eccentric mass is rotated at a speed of around 1500 to 2500 rpm.

9. The method as defined in claim 7, wherein the said eccentric mass is rotated at a speed of around 2200 rpm.

10. The method of lubricating the roller bearings rotatably supporting an eccentric mass for rotation about a horizontal eccentric axis within the cavity of a closed housing resiliently mounted for vibratory movement within and relative to a support frame of a vibratory compactor, comprising the steps of:
   a) providing a layer of lubricating oil within the said housing cavity at the bottom thereof;
   b) rotating the said eccentric mass at a relatively high rate of speed to cause unitary vibration of the said housing and the said layer of oil at a rate sufficient to continuously form thin columns of oil upstanding from the upper surface of said oil layer; and
   c) maintaining the upper surface of the said layer of oil at a level spaced a relatively short distance below the nadir point of the circular path of travel of the maximum radially extending node portion of the said rotating eccentric mass when the compactor is in a vertical operating position to assure the impacting thereof only against the said thin upstanding columns of oil during the rotation of said eccentric mass.

11. The method as defined in claim 10, wherein the said upper surface of the said layer of lubricating oil is maintained at a level spaced a distance of around ⅛" to 1¼" below the said nadir point of the circular path of travel of the said node portion of said rotatable eccentric mass when the compactor is in a vertical operating position.

12. The method as defined in claim 10, wherein the said eccentric mass is rotated at a speed of around 1500 to 2500 rpm.

13. The method as defined in claim 10, wherein the said eccentric mass is rotated at a speed of around 2200 rpm.

14. The method as defined in claim 11, wherein the said eccentric mass is rotated at a speed of around 1500 to 2500 rpm.

15. The method as defined in claim 11, wherein the said eccentric mass is rotated at a speed of around 2200 rpm.

16. The method as defined in claim 10, wherein the said nadir point of the circular path of travel of the maximum radially extending node portion of the said rotating eccentric mass is spaced a distance of about 1" above the upper surface of the bottom wall of said housing cavity and the said oil layer is maintained at a thickness of about ½" to ⅞" when the compactor is in a vertical operating position.

17. The method as defined in claim 16, wherein the said eccentric mass is rotated at a speed of around 1500 to 2500 rpm.

18. The method as defined in claim 16, wherein the said eccentric mass is rotated at a speed of around 2200 rpm.

19. A vibratory compactor comprising a support frame, a closed housing resiliently mounted on said support frame for vibratory movement relative thereto and provided with a flat impactor bottom plate, an eccentric mass rotatably journaled within said housing by roller bearings mounted therein for rotation of said eccentric mass about an eccentric horizontal axis, hydraulic motor means mounted on said housing for rotating said eccentric mass about said axis at a relatively high speed to produce unitary vibratory motion of said housing and said impactor plate, and a layer of lubricating oil in the cavity of said housing lying on the bottom inside surface thereof and having its upper surface spaced below but relatively close to the nadir point of the circular path of travel of the maximum radially extending node portion of said eccentric mass during the said rotation thereof and when the compactor is in a vertical operating position so as to prevent penetration of the said oil layer by the said node portion while permitting impacting of the said node portion only with the thin columns of oil which are continuously formed at and upstand from the top surface of said oil layer during the vibration thereof by the said vibratory movement of the said housing.

20. A vibratory compactor as defined in claim 19, wherein the said upper surface of said layer of lubricating oil is spaced a distance of around ⅛" to 1½" below the said nadir point of the circular path of travel of the said node portion of said rotatable eccentric mass.

21. A vibratory compactor as defined in claim 19, wherein the said eccentric mass is rotated by said motor at a speed of around 1500 to 2500 rpm.

22. A vibratory compactor as defined in claim 19, wherein the said eccentric mass is rotated by said motor at a speed of about 2200 rpm.

23. A vibratory compactor as defined in claim 20, wherein the said eccentric mass is rotated by said motor at a speed of around 1500 to 2500 rpm.

24. A vibratory compactor as defined in claim 20, wherein the said eccentric mass is rotated by said motor at a speed of around 2200 rpm.

25. A vibratory compactor as defined in claim 19, wherein the said nadir point of the circular path of travel of the maximum radially extending node portion of the said rotatable eccentric mass is spaced a distance of about 1" above the upper surface of the bottom wall of said housing cavity, and the said oil layer has a thickness of about ½" to ⅞" when the compactor is in a vertical operating position.

26. A vibratory compactor as defined in claim 25, wherein the said eccentric mass is rotated by said motor at a speed of around 1500 to 2500 rpm.

27. A vibratory compactor as defined in claim 25, wherein the said eccentric mass is rotated by said motor at a speed of around 2200 rpm.

* * * * *